United States Patent [19]

Kadashevich et al.

[11] Patent Number: 5,940,624
[45] Date of Patent: Aug. 17, 1999

[54] TEXT MANAGEMENT SYSTEM

[75] Inventors: A. Julie Kadashevich, Tyngsboro; Mary F. Harvey, Reading; Cheryl Clark, Arlington, all of Mass.

[73] Assignee: Wang Laboratories, Inc., Billerica, Mass.

[21] Appl. No.: 08/094,033

[22] PCT Filed: Jan. 2, 1991

[86] PCT No.: PCT/US91/00739

§ 371 Date: Sep. 26, 1994

§ 102(e) Date: Sep. 26, 1994

[51] Int. Cl.$^6$ ..................................... G06F 15/20
[52] U.S. Cl. ........................ 395/759; 395/760; 395/794
[58] Field of Search .................... 395/751, 758, 395/759, 760, 793, 794, 795, 796, 798

[56] References Cited

U.S. PATENT DOCUMENTS

| | | | |
|---|---|---|---|
| 4,342,085 | 7/1982 | Glickman et al. | 395/794 |
| 4,864,501 | 9/1989 | Kucera et al. | 395/759 |
| 5,323,316 | 6/1994 | Kadashevich et al. | 395/759 |
| 5,369,577 | 11/1994 | Kadashevich et al. | 395/796 |

FOREIGN PATENT DOCUMENTS 0241717  10/1987  European Pat. Off. .

OTHER PUBLICATIONS

Salton, G. & McGill, M.J. "Introduction to Modern Information Retrieval," McGraw–Hill Book Company, 1983, pp. 71–75.

Ozkarahan, E. "Database Machines and Database Management," Prentice Hall 1986, pp. 498–522.

*Primary Examiner*—Jeffery Hofsass
*Assistant Examiner*—Andrew Hill
*Attorney, Agent, or Firm*—Ronald J. Paglierani; Gary D. Clapp

[57] ABSTRACT

An first apparatus for searching a collection of words based upon an input word, the first apparatus including means for generating a first set of words containing members that are lexically related to the input word, the first set of words including words that are other than regular inflectional nouns; and a search engine for searching the collection of words to detect the occurrence of any of the words from a group of search words, the group of search words comprising the input word and the first set of words. Also a second apparatus for generating a plurality of topic words from the collection of words, that apparatus including means for selecting a subset of words from the collection of words; a morphological analyzer for generating morphological information about each of the words in the subset of words; means for evaluating whether a given word of the subset of words conveys information about the content of the collection of words, the evaluation means basing its determination upon the morphological information generated by the morphological analyzer; and means for generating a topic word corresponding to the given word, if the evaluation means determines that the given word conveys information about the content of the collection of words.

20 Claims, 16 Drawing Sheets

History 0:

Record 0:
  {Word:   fish,
   POS:    n.,
   Base:   Record 0,
   Suffix: +0,
   Rating: 0}

Record 1:
  {Word:   fishes,
   POS:    n. pl.,
   Base:   Record 0,
   Suffix: +s,
   Rating: 1}

History 1:

Record 0:
  {Word:   fish,
   POS:    v.,
   Base:   Record 0,
   Suffix: +0,
   Rating: 0}

Record 1:
  {Word:   fishes,
   POS:    v.3rd pres.,
   Base:   Record 0,
   Suffix: +s,
   Rating: 1}

(130) Check to see if current word has alphabetic characters.
(131) If it has no alphabetic characters
(132) Do not index. End processing current word and begin processing next word.
(133) Else continue processing current word.
(134) If current word is a quoted string (has quotation marks around it)
(136) Index the word. End processing current word and begin processing next word.
(137) Else continue processing the current word.
(138) If current word is on the KEEP list
(140) Index the word. End processing current word and begin processing next word.
(141) Else continue processing the current word.
(142) If current word is on the STOP list
(144) Do not index. End processing current word and begin processing next word.
(145) Else continue processing current word.
(146) Call WFSrecognize on current word.
(147) If WFSrecognize returns an indication that word was not recognized

FIG. 4A (148) Index the word. End processing current word and begin processing next word.

(149) Else if WFSrecognize returns an indication that word has character that can't be processed (150) Index the word. End processing current word and begin processing next word.

(151) Else if WFSrecognize returns success (word is recognized)

(152) If current word has 1 part of speech (153) If current word is a noun (154) Index the word. End processing current word and begin processing next word.

(155) Else if current word is an adjective (156) Get the base of current word.

(158) If base is a noun (160) Index the base. End processing current word and begin processing next word.

(162) Else if base is an adjective (164) Get base of the base (166) If base of base is noun

FIG. 4B (168) Index the base. End processing current word and begin processing next word.

(170) Else do not index word. End processing current word and begin processing next word.

(172) Else do not index word. End processing current word and begin processing next word.

(174) Else if current word is an adverb (176) Get the base of current word.

(178) If base is a noun (180) Index the base. End processing current word and begin processing next word.

(182) Else if base is an adjective (184) Get the base of the base (186) If the base of base is noun (188) Index the base of the base. End processing current word and begin processing next word.

(190) Else if base of base is adjective (192) Get the base of base of the base of current word

FIG.4C

(194)  If it is a noun (196)  Index the base of the base. End processing current word and begin processing next word.

(198)  Else do not index word. End processing current word and begin processing next word.

(200)  Else do not index word. End processing current word and begin processing next word.

(202)  Else do not index word. End processing current word and begin processing next word.

(204)  Else do not index word. End processing current word and begin processing next word.

(206)  Else if current word has 2 parts of speech (208)  If one part of speech is a noun and the other part of speech is not an adverb (210)  Index current word. End processing current word and begin processing next word.

(212)  Else do not index word. End processing current word and begin processing next word.

(214)  Else if current word has 3 parts of speech (216)  If one of the parts of speech is a noun (218)  Index current word. End processing current word and begin processing next word.

FIG.4D (220) Else do not index word. End processing current word and begin processing next word.

(222) Else if current word has more than 3 parts of speech (224) Do not index word. End processing current word and begin processing next word.

FIG. 4D

INITIALIZE TEXT ANALYSIS PROGRAM (225)

PASS A BUFFER OF TEXT TO TEXT ANALYSIS PROGRAM (229)

TOKENIZE TEXT (231)

CALL FILTERING PROCEDURE FOR EACH WORD (233)

RETRIEVE INDIVIDUAL TOPIC STRUCTURES (235) IN TOPIC STRUCTURE ARRAY

CHECK TOPIC WORD AGAINST OTHER WORDS IDENTIFIED FOR TEXT (237)

WHEN FINISHED PROCESSING BUFFER OF TEXT OBTAIN NEXT BLOCK OF TEXT (239)

IF NO MORE TEXT, FREE UP DATA STRUCTURES (241)

FIG. 6

SESrecword:

(230) Recognize the input word with WFSrecognize.

(232) For each definition (path in history) of recognized word:

(234) Skip if the part of speech is the same as the last path since any expansion would be the same for this path.

(236) Check if the current part of speech is inflected:

(238) If Inflected:

(240) Check that the base has not already been found for a previous path.

(242) Skip path if base already in information list (244) Otherwise, build a word information object for base.

(246) Check if input word is in the thesaurus as an inflection.

(248) If inflected form is in the thesaurus, also build a word information object for the input word with its data.

(250) If not Inflected:

(252) Check if the word is in the thesaurus data base:

(254) If the word is in the thesaurus:

FIG. 9A (256) Build a word information structure for word.

(258) If the word is not in the thesaurus:

(260) See if the suffix can be stripped and, if so, if base is in the thesaurus, if base is in the thesaurus, build a word information object for base. If base is not in the thesaurus, build an information structure for input word with no thesaurus data.

(262) Return list of information objects

FIG. 9B

Suffixes Which May be Stripped or Added by Subject Expansion Without Changing the Meaning of the Word

| Added | Stripped |
|---|---|
| Inflections | Inflections |
| #ful | #ful |
| #ish | #ish |
| +ous | +ous |
| +ic | +ic |
| +al | +al |
| #ar | #ar |
| #er | #er |
| #or | #or |
| +ive | +ive |
| +ory | +ory |
| #able, +able, +ible | #able, +able, +ible |
| #ment | #ment |
| #ness | #ness |
| +ity, +ety, +ty | +ity, +ety, +ty |
| #ly | #ly |
|  | #ize |
|  | +ify, +fy |
| #y | #y |

FIG. 11

SESexplist (270) Loop through the list of information objects.

(272) Add statistics about the current word for evaluation of how many words are to be generated.

(274) Determine how many entries to generate from each category for each word based on how many words are expected to be generated and the amount of available heap space.

(276) Loop through the list of information object again.

(278) If object is selected to be skipped, go to next object.

(280) If object has been sampled and selections made, call SESgen on those selections.

(282) Otherwise, call SESgen on all of data.

(284) Free any space associated with object (286) Return the results of expansion.

FIG.13

SESgen:

(290) Generate using the input word with the current part of speech:

(292)     Inflections and Derivations.

(294)     Add entries to result list for inflections and any derivations that have a suffix than can be attached to the current part of speech (296) Loop for synonyms from thesaurus:

(298)     If synonym has the same part of speech as the input word:

(300)         Generate inflections and derivations.

(302)         Add entries to result list for inflections and any derivations that have a suffix that can be attached to the current part of speech.

(304)     Go to the next synonym (306) Return list.

FIG.14

TEXT MANAGEMENT SYSTEM

BACKGROUND OF THE INVENTION

The invention relates generally to text management systems.

Each year organizations spend countless hours searching through documents and images, organizing filing systems and databases. Even with large information retrieval systems, considerable resources are needed to index documents, guess which key words will locate needed information, search through pages one query at a time, and sort through all the irrelevant data that the search actually yields.

A number of studies evaluating large information retrieval systems show that these systems are retrieving less than 20 percent of the documents relevant to a particular search, and at that the same time only 30 percent of the retrieved information is actually relevant to the intended meaning of the search request. One of the key reasons for poor retrieval results is that the people who perform retrieval only know the general topics of their interest and do not know the exact words used in the texts or in the keyword descriptors used to index the documents.

Another study analyzed how long it would take to index 5000 reports. It was assumed that each user was allowed 10 minutes to review each report, make indexing decisions by selecting the keywords, and record the information. At this rate, it would take 833 hours or 21 weeks for one full-time person (at 40 hours per week) to process the documents. The users would also need extra time to verify and correct the data. Under such an approach, the user must index incoming documents on a daily basis to keep the system from falling hopelessly behind. In addition, since the user chooses the relevant search terms, all unspecified terms are eliminated for search purposes. This creates a significant risk that documents containing pertinent information may not show up during a search because of the user's subjective judgments in selecting keywords.

Many text retrieval systems utilize index files which contain words in the documents with the location within the documents for each word. The indexes provide significant advantages in the speed of retrieval. One major disadvantage of this approach is that for most of the systems the overhead of the index is 50 to 100 percent of the document database. This means that a 100 Mbyte document database will require an index ranging from 50 to 100 Mbytes. This adds mass storage costs and overhead to the system.

Automated indexing processes have been proposed. For example, in the book, INTRODUCTION TO MODERN INFORMATION RETRIEVAL, by Salton and McGill (McGraw Hill, 1983) a process for automatically indexing a document is presented. First, all the words of the document are compared to a stop list. Any words which are in the stop list are automatically not included in the index. Then, the stems of the remaining words are generated by removing suffixes and prefixes. The generated atoms are then processed to determine which will be most useful in the search process. The inverse document frequency function is an example of such a process. The resulting index of this document, and other documents, may then be searched for articles relevant to the user.

The technique of truncating words by deleting prefixes and suffixes has also been applied to reduce storage requirements and accessing times in a text processing machine for automatic spelling verification and hyphenation functions. U.S. Pat. No. 4,342,085, issued Jul. 27, 1982 Glickman et al. describes a method for storing a word list file and accessing the word list file such that legal prefixes and suffixes are truncated and only the unique root element, or "stem", of a word is stored. A set of unique rules is provided for prefix/suffix removal during compilation of the word list file and subsequent accessing of the word list file. Spelling verification is accomplished by applying the rules to the words whose spelling is to be verified and application of the said rules provides, under most circumstances, a natural hyphenation break point at the prefix-stem and stem-suffix junctions.

SUMMARY OF THE INVENTION

In general, in one aspect, the invention is an apparatus for searching a collection of words based upon an input word. The apparatus includes means for generating a first set of words containing members that are lexically related to the input word, the first set of words including words that are other than regular inflectional nouns; and a search engine for searching the collection of words to detect the occurrence of any of the words from a group of search words, the group of search words comprising the input word and the first set of words.

Preferred embodiments include the following features. The generating mean is a morphological analyzer. The collection of words is an index or text. The generating means generates certain members of the first set of words by stripping from the input word only suffixes selected from a first group of suffixes. The first group includes only those suffixes which do not substantially change the meaning of words when stripped therefrom. In particular, the first group of suffixes include members selected from a first subset containing all inflectional suffixes, #ful, #ish, +ous, +ic, +al, #ar, #er, #or, +ive, +ory, #able, +able, +ible, #ment, #ness, +ity, +ety, +ty, #ly, #ize, +ify, +fy, and #y. The morphological analyzer includes a recognition engine for recognizing the input word and returning derivational information bout the recognized input word. The recognition engine operates by parsing the input word to identify any stems within the input word and, for each identified stem, to identify suffixes which are added to produce the input word. The recognition engine returns a derivational history including information about any parses that were successfully performed by the recognition engine on the input word. The derivational history contains, for each successful parse of the input word, the part of speech of the input word for that particular parse.

Also in preferred embodiments, the apparatus includes a thesaurus database and the generating means uses that thesaurus database to generate a group of synonyms, the members of which are synonyms of certain members of the first set of lexically related words. The group of search words further includes the group of synonyms. The generating means generates a second group of words from selected members of the group of synonyms by adding only those suffixes to selected members of said group of synonyms which are selected from a second group of suffixes. The group of search words further includes the second group of words. The members of the second group of suffixes includes only those suffixes which do not substantially change the meaning of words when added thereto. In particular, the second group of suffixes includes members selected from a second subset containing all inflectional suffixes, #ful, #ish, +ous, +ic, +al, #ar, #er, #or, +ive, +ory, #able, +able, +ible, #ment, #ness, +ity, +ety, +ty, #ly, and #y.

In addition, the morphological analyzer further includes a generation engine for generating a second set of words that are lexically related to selected members of the group of synonyms. The generation engine generates the second set of words based upon information supplied by the recognition engine for the input word. The group of search words also includes the second set of words. The apparatus further includes a selection means for selecting members of the group of synonyms to identify the selected members.

In general, in another aspect, the invention is a subject expansion system for expanding an input word into a plurality of related words. The system includes means for receiving the input word; and means for generating a first group of words from the input word, wherein the generating means generates at least some of the first group of words by subtracting only suffixes selected from a first group of suffixes, the members of the first group of suffixes including only those suffixes which do not substantially change the meaning of words when stripped therefrom.

Preferred embodiments have the following features. The generating means also generates at least some of the first group of words by adding to words derived from the input word only those suffixes which are selected from a second group of suffixes, the members of the second group of suffixes including only those suffixes which do not substantially change the meaning of words when added thereto. The subject expansion system also includes a thesaurus database, which the generating means uses to generate a group of synonyms, wherein the members of the group of synonyms are synonyms of certain members of the first group of words. The generating means expands the group of synonyms into a larger group of words by adding to selected members of the group of synonyms only those suffixes which are selected from the second group of suffixes. The generating means includes a morphological analyzer, which, in turn, includes a recognition engine for generating a base history for the input word. The base history identifies one or more base words for the input word, each of the base words representing the input word with one or more suffixes removed.

In general, in yet another aspect, the invention is a subject expansion system for generating a group of words from an input word. The system includes means for removing suffixes from the input word to generate one or more base words; and a thesaurus means adapted to receive one or more of the base words and generate a group of synonyms for certain of them. The generating means includes a recognition engine for generating a base history for the input word, the base history identifying the one or more base words. The generating means further includes a generation engine for generating a second set of words containing members that are lexically related to selected members of the group of synonyms. The system also includes a selection means for selecting members of the group of synonyms to identify the selected members.

In general, in still another aspect, the invention is an apparatus for generating an index for a collection of words. The apparatus includes means for selecting an input word from the collection of words; means for generating words that are lexically related to the input word, wherein the input word and the lexically related words form a group of words; and an indexing engine for representing the occurrence in the collection of words of any of the members of the group by a single member of the group.

In general, in another aspect, the invention is an apparatus for generating a plurality of topic words from a collection of words having certain informational content. The invention includes means for selecting a subset of words from the collection of words; a morphological analyzer for generating morphological information about each of the words in the subset of words; means for evaluating whether a given word of the subset of words conveys information about the content of the collection of words, the evaluation means basing its determination upon the morphological information generated by the morphological analyzer; and means for generating a topic word corresponding to the given word, if the evaluation means determines that the given word conveys information about the content of the collection of words.

Preferred embodiments include the following features. The collection of words is text. The means for selecting includes a stop list containing words which do not qualify as topic words, and the means for selecting excludes from the subset of words those words from the collection of words that fall within the stop list. The means for selecting also includes a keep list containing words which automatically qualify as topic words, and the means for selecting includes in the subset of words those from the collection of words that fall within the keep list. The apparatus further includes an indexing engine, wherein the indexing engine uses the topic word generated for the given word to create an index for the collection of words.

Also in preferred embodiments, the morphological analyzer includes a recognition engine for recognizing one or more successful parses of the given word, wherein a successful parse exists when the recognition engine is able to decompose the given word into an underlying stem and a sequence of one or more suffixes which when added to the underlying stem form the given word. The recognition engine generates a morphological history for each successful parse of the given word. The morphological history for a successful parse identifies a part of speech for the given word, one or more base words associated within the given word and a part of speech for each of the base words. The evaluating means evaluates whether the given word conveys information about the content of the collection of words based upon the number of successful parses of the given word, and based upon the one or more parts of speech identified for the given word. The topic word generating means selects as the topic word either the given word or one of the base words identified within a morphological history associated with a successful parse of the given word.

One advantage of the invention is that it substantially improves the completeness of results in document and/or text searches. Furthermore, the invention automatically expands keywords in a search to include lexically related words, synonyms of certain of said lexically related words, and words that are lexically related to the synonyms. In addition, the invention gives a user the ability to search text and other documents for concepts without knowing the exact form in which the concepts are discussed. Furthermore, the invention is capable of analyzing and expanding a keyword to include synonyms even when the keyword is not in a thesaurus.

Another advantage of the invention is that it can be used to substantially reduce this overhead in document indexing by identifying the words that are important to the content of the document and generating an index containing this subset of words. This not only saves disk space but also processing time, since the search operations can be performed on a much smaller index. The invention generates a list of topic words from text, each of which is informative about the content of the text, and it excludes words from text that do not convey much information. Using linguistic information to perform this task provides several principled ways of distinguishing words with high information content from words with low information content.

Another advantage is that the invention helps eliminate additional redundancy in an index of concepts found within text by identifying words that are related by inflection or derivation (e.g., "category" and "categories," "subject," "subjects," and "subjectness"). Instead of representing each instance of a word that differs slightly from previous instances, a base of the word is stored and used to represent all forms that can be derived from it. Thus, for example, "category" may be stored once in the list and it can represent "category," "categories," and even "categorical." This greatly reduces the storage required for indexes to text.

The filtering procedures described in this application were applied to a number of text samples for evaluation, including a 153-word paragraph from a linguistics article, a 447-word financial memo, and a page from a functional specification containing 550 words. The resulting lists for these three contained 23%, 25%, and 17% of the words in the original text, respectively. The results obtained by testing other text samples were consistent with these numbers. The filtering mechanisms of the invention can identify 75% to 80% of the text as irrelevant to the topic of the text.

Other advantages and features will become apparent from the following description of the preferred embodiment and from the claims.

DESCRIPTION OF THE PREFERRED EMBODIMENT

Figure 5:
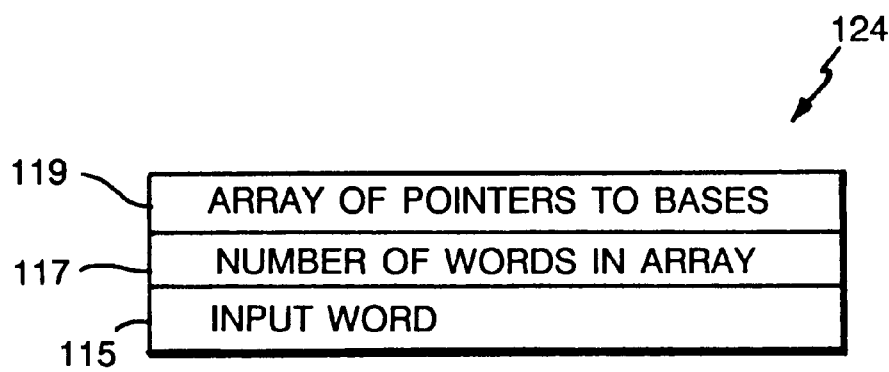
Figure 7:
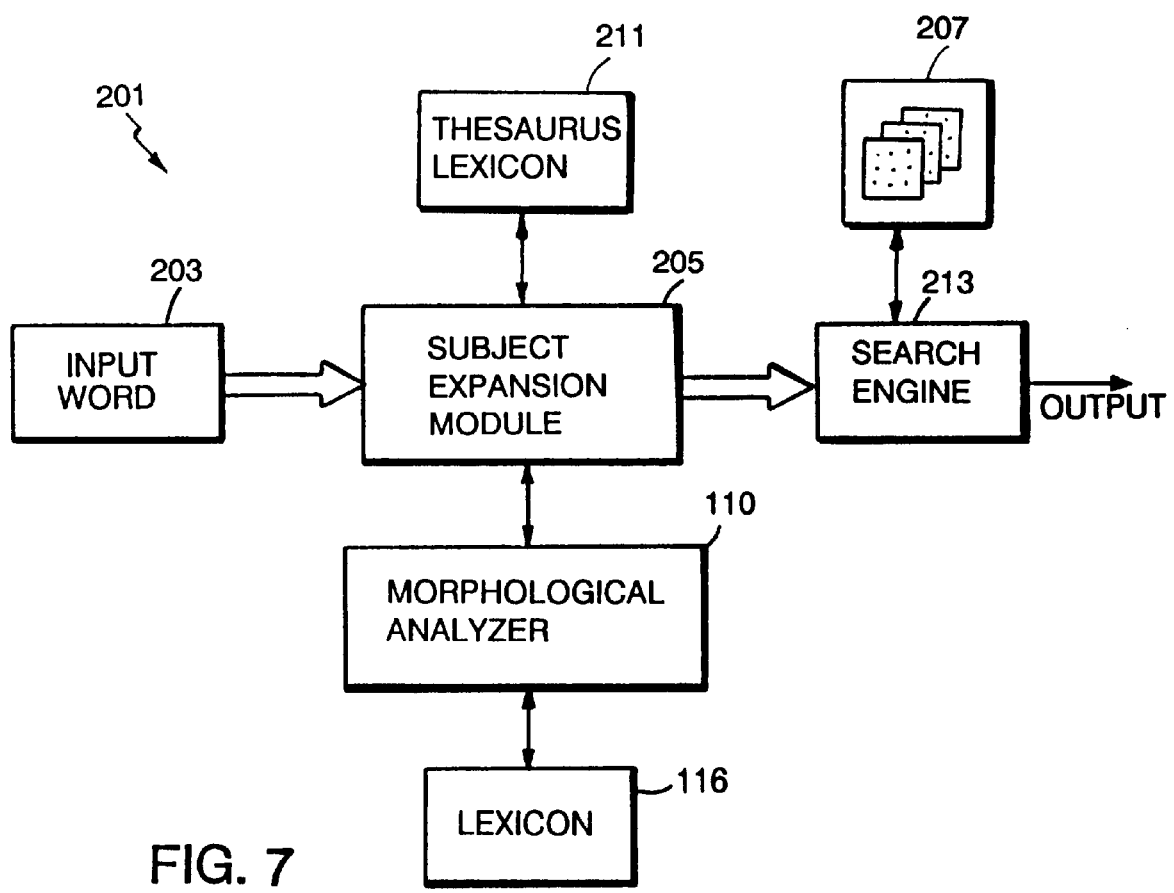
Figure 8:
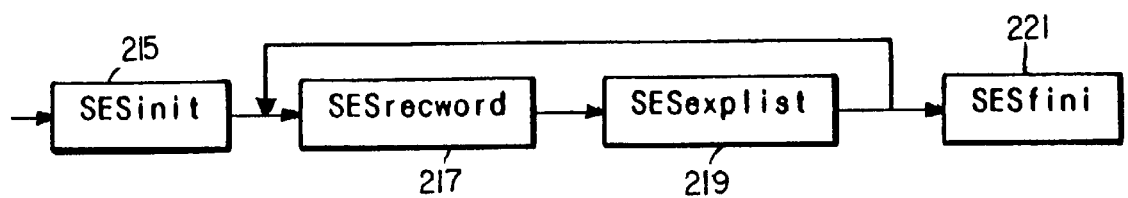
Figure 12:
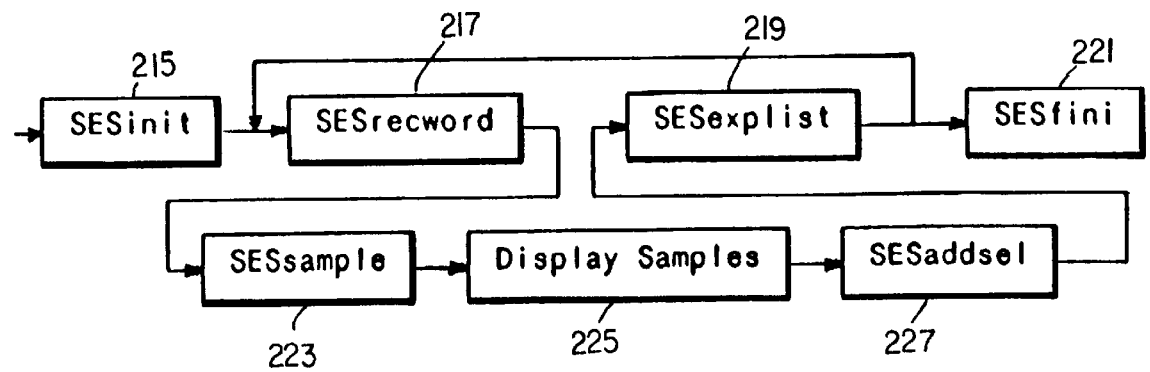
Figure 10:
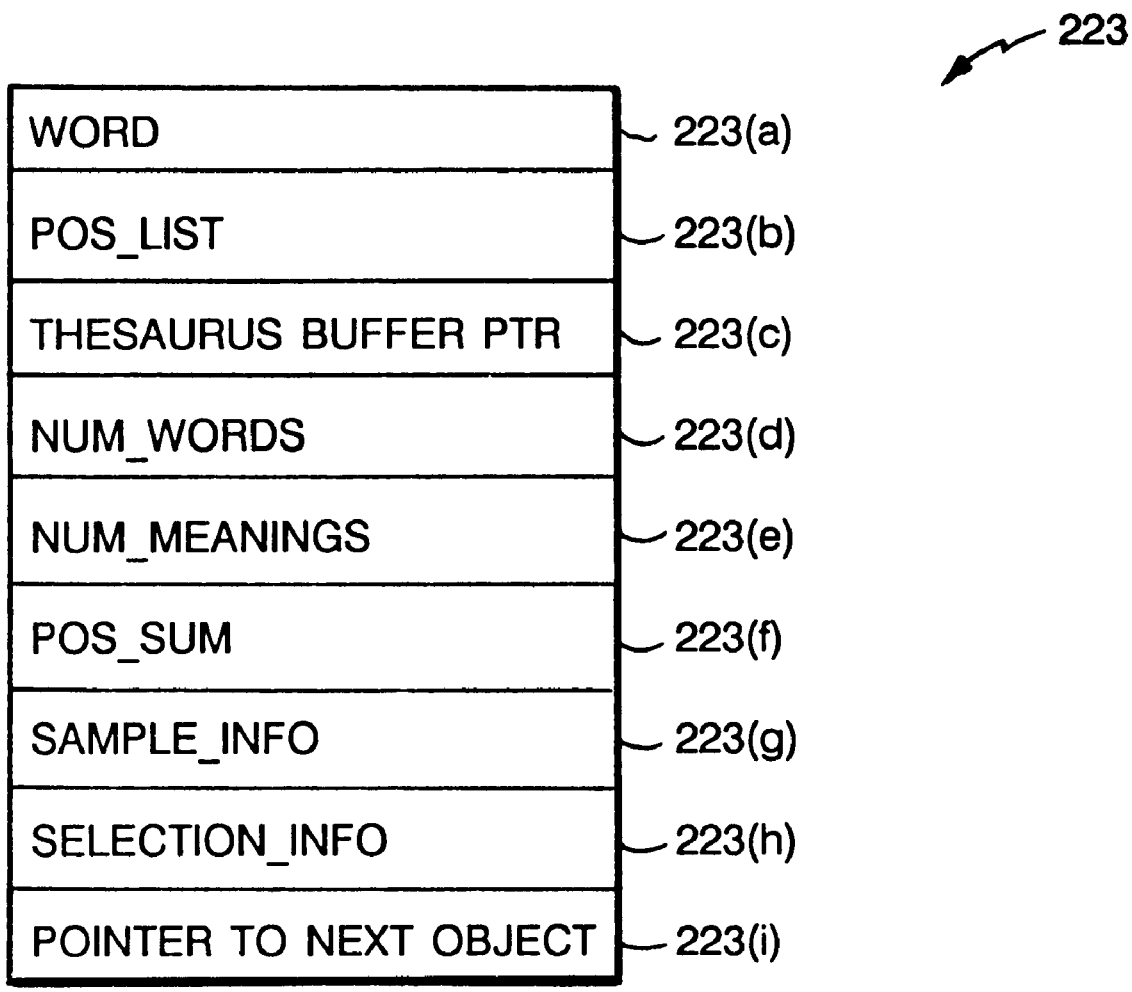

FIGS. 4a–d present a pseudo-code description of the operation of the intelligent filter;

FIG. 5 is a topic data structure used by the intelligent filter to pass topic information back to the application;

FIG. 6 illustrates the use of the intelligent filter to analyze text, one block at a time;

FIG. 7 is a block diagram of a text searching system including a subject expansion module;

FIG. 8 is a block diagram of the subject expansion module shown in FIG. 7;

FIGS. 9a–b present a pseudo-code description of the operation of SESrecword;

FIG. 10 is an information object which is a member of the information list data structure created by SESrecword;

FIG. 11 is a list of suffixes which can be added to a word and a list of suffixes which can be stripped from a word without significantly changing the meaning of the word;

FIG. 12 is a block diagram of another embodiment of the subject expansion module shown in FIG. 7;

FIG. 13 is a pseudo-code description of the operation of SESexplist; and

FIG. 14 is a pseudo-code description of the operation of SESgen.

Structure and Operation

Figures 1, 2:
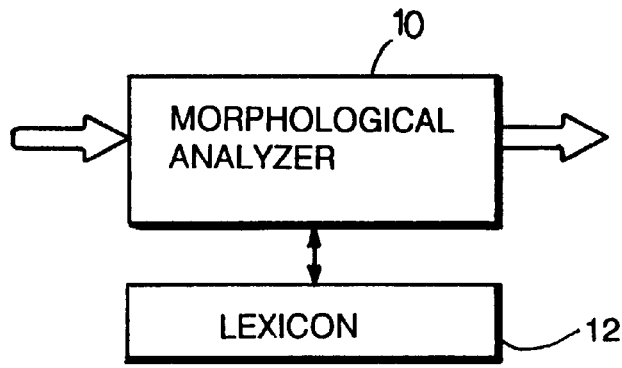
FIG. 1 is a block diagram showing a morphological analyzer and a lexicon.
FIG. 2 is a base history for 'fish'.

Referring to FIG. 1, two principal components of the embodiments described herein are a morphological analyzer 10 and a lexicon 12.

The Lexicon

Lexicon 12, contains information about the underlying (lexical) forms of all the words that can be generated or recognized (in their surface form) by morphological analyzer 10. Lexicon 12 is not simply a listing of all these words in their underlying form, but instead contains morphological items, referred to as morphemes, that are combined to build the lexical forms of words. For example, the morphemes 'success'+'full'+'ly' form the word 'successfully'. Associated with each morpheme is information that can include the part of speech the morpheme forms, related forms, and a list of what kinds of morphemes can follow the current one.

The Morphological Analyzer

The main functions of morphological analyzer 10 are recognition and generation. An internal function, referred to as WFsrecognize, implements the recognition capabilities of morphological analyzer 10. Another internal function, referred to as WFSgenerate, implements the generation capabilities of morphological analyzer 10. WFSrecognize analyzes a word to determine its morphological structure, and WFSgenerate generates the correct spelling of a word given its underlying morphological structure.

When performing recognition, morphological analyzer 10 analyzes an input string, identifying its root (or roots), any intervening words in its derivational history, any suffixes it may contain, and the lexical categories of all words in the derivational history. If the input string is successfully parsed (i.e., if a stem and the associated suffixes required to form the input word are found), morphological analyzer 10 returns a base history. If the input word has more than one parse, a base history for each is returned, each history (or path) presenting a listing of each form of the input word as each successive suffix is stripped. Thus, for example, in the case of 'fishes', two histories, shown in FIG. 2, are returned.

Each base history includes one or more records showing the bases that result from successively stripping off suffixes. Note that the word left after a suffix has been removed is called the base of the word with the suffix added. If no more suffixes can be stripped off a word, the word is the root of the other words. Each record contains the word from which a suffix is stripped, the part of speech of that word, an index referring to the record in the history that contains the base that is formed after the suffix is stripped, the suffix which is added to the base to make the word and the rating of the suffix which was added. The suffix rating is a number that is used to classify a suffix and the word it forms. Suffixes are grouped according to the closeness in meaning before and after the suffix is added. For example, inflectional endings, which simply change grammatical features of the original word, have a rating of 1. Derivational endings, which usually change the part of speech of the original word and generate a word more distant in meaning, have a rating of 2.

When performing generation, morphological analyzer 10 synthesizes words that are lexically related to a given word, adding suffixes, if appropriate, using any restrictions specified with the input regarding suffixes or lexical category to control the size and content of the set of words returned. Generation involves the following sub-tasks. Morphological analyzer 10 first does recognition on the input string to find out: how many parses the input string has; its stem or stems; and if it already contains suffixes. Morphological analyzer 10 then identifies the stem which is to be used for synthesis. Next, morphological analyzer 10 determines what suffixes can be added to it and returns al surface strings that can be synthesized from the lexical input word.

Text Management Functions

In accordance with one aspect of the invention, the morphological analyzer is used to aid text management functions, such as indexing and searching. Embodiments for carrying out this text management function will now be described.

Figure 3:
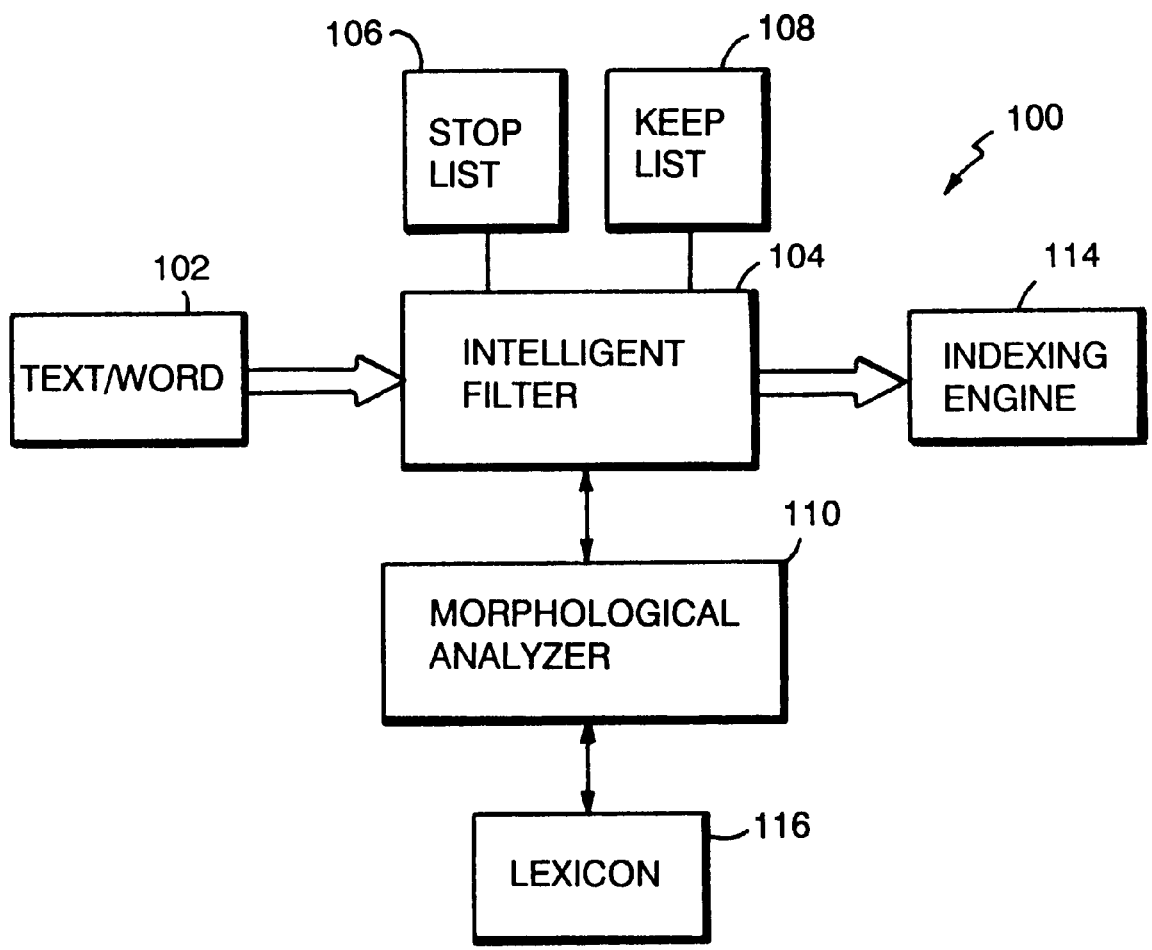
FIG. 3 is a block diagram of an indexing system which includes an intelligent filter.

Referring to FIG. 3, in an indexing system 100, input words 102 from a block of text are passed to an intelligent filter 104 that automatically identifies which of the input words are topic or concept words, i.e., words which describe the meaning of the text in which the words appear. Intelligent filter 104 uses several mechanisms to identify the topic words, including a stop list 106, which lists words that are automatically rejected as topic words, a keep list 108, which lists words that are automatically accepted as topic words, and a morphological analyzer 110, which analyzes the input word to identify its morphological structure. Morphological analyzer 110 makes use of a lexicon 116 to perform the morphological analysis of the input words that are passed to it. Intelligent filter 104 uses the morphological information derived for the input words that are sent to morphological analyzer 110 to determine which of the input words are most likely to be topic words. The list of topic words generated by intelligent filter 104 then passes to a conventional indexing engine 114, which uses the topic words to generate an index for the text from which the input words were extracted. Indexing engine 114 may use any one of a number of known indexing techniques to either produce index cards for the text being indexed or to generate an index identifying the location of the topic words within the body of the text.

Stop list 106 contains a list of words that typically do not convey topic information, such as articles, prepositions, conjunctions, and other function words. A substantial number of the words in this list can be identified from a dictionary on the basis of their part of speech. The value of adding all of such words to a stop list is that intelligent filter 104 need not waste time and computational resources of morphological analyzer 110 to analyze those words. Stop list 106 also includes words that were identified by running samples of text through intelligent filter 104 and then analyzing the results to identify words that appear at the output but clearly do not convey topic information. Thus, another value of stop list 106 is that it serves to catch those few words that are not caught by the analytic component of the intelligent filter 104.

Keep list 108 serves the opposite function to that of stop list 106. It specifies words that the analytic component of intelligent filter 104 might tend to reject even though they convey topic information. Keep list 108 may be empirically generated by running several sample documents through intelligent filter 104 and then identifying those words which were rejected but which the user feels should be included among a list of topic words. In this way, keep list 108 provides a mechanism for fine tuning the system and for customizing the system to the particular needs and the unique vocabulary of particular users.

The operation of intelligent filter 104 will now be described with the aid of the flow diagram presented in FIGS. 4a–d. When a text indexing application program needs to index a block of text, it first calls an initialization function to open up the functions and lexicons (i.e., the reference works) that will be used by intelligent filter 104 to analyze the words passed to it. The application which calls intelligent filter 104 also allocates space for a topic structure 124 (see FIG. 5), which is used by intelligent filter 104 to pass topic information back to the application. Topic structure 124 includes a field 115 for the input word which was analyzed, a field 119 for an array of pointers to the bases that were found in the input word, and a field 117 for the number of bases within the array.

In its call to intelligent filter 104, the application passes an input word 102, i.e., the current word. Referring to FIGS. 4a–d intelligent filter 104 first determines whether the current word qualifies for morphological analysis by checking whether it contains alphabetic characters (step 130). If it does not have alphabetic characters, filter 104 rejects the current word as a topic word and requests the next word from the application program (step 132). If the current word does have alphabetic characters, filter 104 checks whether there are quotation marks around it (step 134). If the current word is a quoted string, filter 104 identifies it as a topic word and passes this information to indexing engine 114 using topic data structure 124 so that indexing engine 114 can index the current word (step 136). Then filter 104 requests another word. On the other hand, if the current word is not a quoted string, filter 104 looks up the word in keep list 108 (step 138).

If the current word appears in keep list 108, filter 104 indexes the word and moves on to the next word (step 140). If the current word does not appear in keep list 108, filter 104 compares it against stop list 106 (step 142). If the current word appears in stop list 106, filter 104 rejects the word and requests the next word (step 144). If the current word does not appear in stop list 106, filter 104 calls upon the recognition capability of morphological analyzer 110, namely, WFSrecognize, to obtain a morphological analysis of it (step 146).

WFSrecognize identifies the stems within the current word and determines which suffixes have been added to those stems to create the current word. The analysis begins with the first character in the current word and proceeds one character at a time until each stem and any suffixes which have been attached to that stem are found. That is, WFSrecognize parses the input word. When the analysis is complete, WFSrecognize returns a base history for the current word. The base history consists of a list of history arrays, each of which contains the records of a corresponding one of the successful parses which were found.

It is possible that WFSrecognize will not find the current word or any base words for the current word within lexicon 116. In that case WFSrecognize indicates that the word was not recognized. This occurs for words such as some proper names (e.g., Nixon). When WFSrecognize reports that the current word was not recognized, filter 104 treats the current word as a topic word, indexes it and then requests the next word (step 148).

It is also possible that the current word contains a character that cannot be processed by WFSrecognize. In such cases, filter 104 indexes the word and then moves onto the next word (step 150).

If WFSrecognize succeeds in parsing the current word, intelligent filter 104 uses the returned base history information to evaluate whether the current word is a topic word. First, filter 104 checks whether the current word has only one part of speech associated with it (i.e., was there only one successful parse of the word?) (step 152). If only one part of speech was returned, filter 104 checks what the part of speech is. If the part of speech is a noun, filter 104 indexes the current word and moves on to the next word (step 154). For example, the current word might be 'history' or 'science', both of which are nouns, in which case, filter 104 indexes the word.

On the other hand, if the part of speech is an adjective, such as 'historic' or 'scientific', filter 104 obtains the base of the current word and checks its part of speech (step 156). (Recall that the base is identified in the base field of the history record for the current word.) If the part of speech of the base of the current word is a noun, filter 104 indexes the base and then moves onto the next word (steps 158–160). If the part of speech of the base is an adjective, filter 104 obtains the base of the base and checks its part of speech (steps 162–164). For adjective bases, filter 104 indexes the base only if the base of the base is a noun (step 168). Otherwise, it rejects the word and moves on to the next word (step 170). For example, if the current word is 'historical', i.e., an adjective having a noun base of 'history', filter 104 indexes history. If the base is neither a noun nor an adjective, filter 104 also rejects the current word and moves on to the next word.

If the current word is an adverb, filter 104 performs a similar analysis to that which it performed for an adjective (steps 174–202). That is, filter 104 gets the base of the current word and checks its part of speech. If the base is a noun, filter indexes the base and moves on to the next word. However, if the base is an adjective, filter 114 looks at the next level, i.e., the base of the base. If the base of the base is a noun, as in the case of 'scientifically', filter 104 indexes the base of the base (i.e., 'science') and moves on. If the base of the base is an adjective, however, filter moves to the next level of the history for the current word and looks at the base of the base of the base, if one exists. If the base of the base of the base is a noun, filter 104 indexes that base, otherwise, it rejects the word and moves on.

If the current word has only one part of speech and if it is not a noun, an adjective or an adverb, filter 104 rejects it. Similarly, if the current word is an adverb but its base is neither a noun nor an adjective, filter 104 rejects it.

For the cases in which the current word has two (and only two) parts of speech (i.e., it is ambiguous), filter 104 indexes the word only if one part of speech is a noun and the other part of speech is not an adverb (steps 206–212).

For the cases in which the current word has three parts of speech (and only three), filter 104 indexes the word only if one of its parts of speech is a noun (steps 214–220).

Finally, for those cases in which the current word has more than three parts of speech, filter does not index the word (steps 222–224).

In the above description, it should be noted that if the current word is ambiguous (e.g., 'leaves' may be the plural of 'leaf' or the third person singular of the verb 'leave'), filter 104 will output more than one base for the word.

After filter 104 has processed all of the words in the text, the application frees up any allocated tables that were used and it closes the reference work.

After the application has used the information in the topic structure that was passed to the application, the application also frees the memory allocated for it.

In the above-described embodiment, text is processed one word at a time. That is, the application program passes each word to intelligent filter 104, one word at a time, and generates an index using whatever is returned. It is also possible for the application to pass a block of text to intelligent filter 104, in which case filter 104 generates an array of topic structures, one structure for each topic word identified in the block of text. In that case, the application program calls a text analysis program which operates as shown in the flow diagram of FIG. 6.

The application program first initializes the text analysis program, and the appropriate data structures and it opens the reference work containing the text that is to be indexed (step 225). Then, the application program fills a buffer with a first block of text to be analyzed and passes this to the text analysis program which, in turn, tokenizes the text to identify the individual words within it (steps 229 and 231). Known techniques may be used to tokenize the text, using, for example, spaces and/or quotation marks as indicators of word boundaries. The text analysis program calls intelligent filter 104 for each word found within the block of text (step 233). Intelligent filter 104 processes the words passed to it and builds a topic structure array including the individual topic structures produced for each of the topic words found among the words from the block of text. After the topic structure array for the entire block of text is complete, the application program retrieves the individual topic structures within the array and checks each topic word to see if it has already been identified for the text. If it has not, the topic word is added to a list of concepts associated with the text (steps 235–237).

The application program continues in this fashion through the text, one block at a time until the entire text has been indexed (step 239). After processing all of the text, the application program frees up the memory which was used during the text analysis operation and closes all relevant files.

Note that intelligent filter 104 tends to compress the size of the index required for any given text for at least two reasons. First, it identifies words that qualify as topic words and rejects other words which do not relate to content of the text. In addition, for many text words it supplies a word that is lexically related to the text word and the indexing engine indexes the lexically related word. As a consequence, a group of lexically related words within the text tends to be represented by a single word selected from the group of lexically related words.

The approach of using a single word to represent a group of lexically related words in a text index may be employed by itself. In that case, the user might manually select a word from text which is to be represented in the index and then use the recognition capabilities of the morphological analyzer to produce a group of words that are lexically related to the selected word. As the indexed word, the indexing engine would then use a word selected from the set of words formed by the original word and its lexically related words. In other words, each word in the resulting index represents a set of lexically related words within the text. In that case, each of the lexically related words in the text does not appear as a separate word in the index.

FIG. 7 illustrates a system 10 in which morphological analyzer 110 assists in searching text. In text search system 201, an input word 203, which is part of a search request generated by a user, is passed to a Subject Expansion Module (SES module) 205 where it is expanded into a list of related subjects. A search engine 213 uses the expanded list generated from the input word to search text stored in a memory 207 and to return as output the identity of those documents which refer to any of the items appearing on the expanded list. To perform its subject expansion functions, SES module utilizes morphological analyzer 110 to generate a list of words lexically related to the input word. Morphological analyzer 110 relies upon the information stored in a lexicon 110 to perform a morphological analysis of the input word and generate a corresponding base history. The history contains the different bases found within the input word and the suffixes that are attached to those bases to generate the input word. Using the information developed by morphological analyzer 110, SES module 205 uses a thesaurus lexicon 211 to expand certain of the lexically related words into a list of synonyms for those words. In general, the expansion is done for each of the definitions that are found for the input word, i.e., for each part of speech. However, since synonyms are not available for all words, in the cases when synonyms are not found for the input word, SES module 205 uses lexically related words that are found within the base history generated for the input word.

The operation of SES module 205 is generally illustrated by the block diagram shown in FIG. 8. When an input word is passed to SES module 205, it calls an SESinit function 215 to initialize the data structures, functions and lexicons which will be used during its operation. After initialization, a SESrecword function 217 uses morphological analyzer 110 to construct a base history for the input word and, using the information available in the base history, generates a list of synonyms from thesaurus lexicon 211. For each of the words and the synonyms generated by SESrecword, a second function SESexplist 219, takes the words and synonyms generated by SESrecword 217 and generates a set of lexically related words and synonyms and lexically related synonyms, which it passes along with the input word and its lexically related words to search engine 213 as an expanded list to be used for searching. After the expansion task is completed, a SESfini function 221 frees up the memory that was initialized for this operation and closes the lexicons. SESrecword 217 and SESexplis, 219 will now be described in greater detail.

SESrecword 217 operates as shown in FIGS. 9a–b. When the function is first called, it uses WFSrecognize to analyze the input word that is passed as part of the function call (step 230). For each successful parse of the input word WFSrecognize returns a history. Each history contains, among other things, the stem, the suffixes which are attached to the stem to form the input word and the part of speech of the input word. Since it is possible that more than one definition of the word exists, WFsrecognize may find more than one successful parse.

After WFSrecognize completes its recognition function and returns the information, SESrecword 217 loops through each definition (i.e., path in the history) that is returned (step 232) and for each path, it performs the following operations. First, it checks whether the current path has the same part of speech as any other path which it has processed thus far (step 254). If the current path has the same part of speech as a previously processed path, SESrecword 217 skips the current path and moves on to the next one (step 236). Note that the expansion of a path that yields the same part of speech as a previously expanded path will also yield the same expansion.

If the part of speech for the current path is new, SESrecword 217 checks whether the current part of speech is inflected (step 236). If it is inflected, there is the possibility that the base for the current path has already been found for a previous path. For example, the past tense and the past participle of a verb have the same base and, therefore, yield the same expansion. To avoid duplicating previous work and in the case of inflected words, SESrecword 217 checks the base of the current path against other bases that have been found for other paths (step 240). Information about the other paths is stored in an information list that SESrecword 217 is building during this process to return its results to the application program. The information list, which is a collection of different forms that are recognized for the input word, is a linked list of information objects 223, as illustrated in FIG. 10. If the base is found within the information list, SESrecword 217 skips the current path. Otherwise, it checks whether the base form is in thesaurus lexicon 211. If the base form is in the thesaurus lexicon, SESrecword 217 builds a new information object 223 for the base and adds the new object to the information list. The new object contains all of the synonyms that were found in the thesaurus lexicon associated with that base.

Referring back to FIG. 10, each object 223 includes a field 223(a) containing the word for which synonyms were found, a pos_list 223(b) identifying the parts of speech associated with the word, a thesaurus buffer (TH buffer) 223(c) which contains all of the synonyms for the word, and a pointer 223(i) to the next object in the list. Each information object also includes a num$_{13}$ words field 223(d) for specifying the number of synonyms in TH buffer 223(c), a num_meanings field 223(e) for the number of different meanings or connotations that were listed for the word, and a pos_sum field 223(f) for predetermined statistics about the average number of generated forms that will typically result from expanding the word as a function of its part of speech. In other words, pos_sum provides a basis for estimating how many words an expansion of the list of words in TH buffer 223(c) will produce. Experience indicates that the number of words that an expansion will produce depends on the part of speech of the word. For example, a noun typically results in three words when expanded, a verb results in seven words and an adjective results in four words. This information is used later by the expansion function to determine how many words of the TH buffer to expand.

Each information object 223 also includes a sample information (sample_info) field 223(q) containing an array of pointers to each of the possible samples within TH buffer 223(c) and a selection info field 223(b). A sample is defined as a possible meaning or connotation of the word. In the case of the College Thesaurus, synonyms are organized into different meaning categories. The pointers in sample_info field 223(q) identify the beginning of each of the categories within TH buffer 223(c). As will be explained in greater detail shortly, in some embodiments, the user is offered the option of selecting which samples to include within the expansion performed by SESexplist 219. The user's indications are recorded in selection_info field 223(k) for later use.

Referring again to steps 238–248 in FIG. 9a, after constructing the information object for the base or after determining that the base form is not found in the thesaurus lexicon, SESrecword 217 also checks whether the input word is in the thesaurus as an inflection (step 246). If it is, SESrecword builds another information object for the input word (step 248).

For the cases in which the part of speech for the current path is not inflected, SESrecword 217 checks if the word is in the thesaurus lexicon (step 252). If the word is in the thesaurus lexicon, an information object is built for the word and added to the information list (step 256). On the other hand, if the word is not in the thesaurus, SESrecword 217 examines its history to determine whether a suffix can be stripped from the word to form a base having substantially the same meaning (steps 258–260). The words have substantially the same meaning means, for example, if the function of the words created by stripping the suffix is semantically the same as the function of the word from which the suffix is stripped. Only certain suffixes can be stripped without significantly changing the meaning of the word. A list of those suffixes appears in FIG. 11. (Note that '+' and '#' are boundary characters or markers following Aronoff, Mark (1976) *Word Formation in Generative Grammar*, Linguistic Inquiry Monograph 1, MIT Press, Cambridge, Massachusetts.) Such a list is stored in a table which SESrecword accesses to determine whether it is permissible to strip the current suffix so as to create a word from which synonyms may be generated. If the suffix can be stripped, SESrecword 217 tries to find the resulting base in the thesaurus lexicon. If the base is found, the function builds a word information object for the base. If it cannot be found, however, the function builds a word information object for the input word without any thesaurus data.

After SESrecword has looped through each path and performed the operations described above, it returns the completed list of information objects to the application program.

As shown in FIG. 12, in another embodiment, SES module 205 is modified to permit the user to skip over information objects for expansion or to select the synonyms within an information object for which expansion will be performed (an operation referred to generally as sampling). In the modified version of SES module 205, the application passes the output of SESrecword 217 to a SESsample function 223 which selects a subset of words from each category (i.e., from each meaning) and the application displays these subsets of words to the user. In the present embodiment (i.e., with the College Thesaurus), SESsample 223 selects the first two words in each category for display. The user then selects which information objects are to be skipped and the categories within information objects for which expansion is desired. Another function, namely, SESadd_sel 227, stores the user's selections in selection_info field 223(b) of the appropriate information object 223 (see FIG. 10).

In both embodiments described above, the actual expansion of the words returned by SESrecword 217 is performed by two other functions, namely, SESexplist 219 and SESgen 221 and illustrated in the flow diagrams of FIGS. 13 and 14, respectively. Each of those functions will now be described.

SESexplist 219 takes the information list returned by SESrecword 217 and expands it to include lexically related words generated from the recognized forms of the input word and the synonyms found by SESrecword 217. Referring to FIG. 13, when SESexplist 219 is first called, it loops through the list of information objects (step 270) and computes the total number of words in the TH buffers from the numbers in num_words fields 223(d) (see FIG. 10) (step 272). Then, using the information store in pos_sum field 223(f), SESexplist 219 estimates the total number of words likely to result from expanding all of the sampled categories obtained through the thesaurus (step 274). (If the sampling feature is not present, it is assumed that words from all categories will be expanded.) The total number is then scaled to reflect any limitations that might exist on available memory. In a DOS environment, for example, the memory space limitations can be quite severe; whereas, in other environments, such as virtual memory systems, it may not be necessary to limit the number of words that are generated. Using the scaled number, SESexplist 219 computes the number of words that can be safely chosen from each sampled category for expansion without exceeding the available memory. The distribution of words chosen from the categories is performed so as to fairly represent all of the sample categories in the TH buffers 223(c). That is, some number is chosen from all selected categories with the larger categories receiving larger representation than the smaller categories.

After SESexplist 219 determines the number of words that can be expanded from each category, it loops through the list of information objects again to perform the actual expansion operations (step 276). For the current information object, SESexplist 219 first checks whether it was selected to be skipped (step 278). If the current object is marked to be skipped, SESexplist 219 moves on to the next information object. If the current object is not selected to be skipped, SESexplist 219 checks whether it has been sampled by examining the contents of its selection_info field 223(h). If the object has been sampled and selections were made, SESexplist calls SESgen 221 on those selections. In this phase of operation, SESgen 221 expands the permitted number of words within the sampled category based upon the computations performed in steps 272 and 274, above.

If the object has neither been skipped nor sampled, SESexplist 219 calls SESgen 221 on all of the data present in the object (step 282). During this step, SESgen only expands the number of words in each category that are permitted by the limitations computed in steps 272 and 274, above.

When SESexplist 219 is done expanding the word in a given information object, it frees up any space associated with that object (step 284). After SESexplist has looped through all information objects, it returns the results of the expansion to search engine 213, which constructs a search based upon the information in the expanded list. In other words, search engine 213 conducts its search using the input word, words that are lexically related to the input word, synonyms of the input word and of the words that are lexically related to the input word (if any such synonyms exist), and words that are lexically related to the synonyms. Search engine 213 uses any one of a number of known techniques to use the expanded list to conduct the search for all documents or locations within documents that refer to any words on the expanded list.

The repeated calls to SESgen 221 generate the result list that is returned. As shown in FIG. 14, when SESgen is called, it first identifies the input word and its part of speech from the information found within the appropriate fields of the information object (step 290). For the input word, SESgen calls a generation function, WFSgenerate, which causes morphological analyzer 110 to produce all inflections and derivations that can be generated from that word by the addition of one suffix. It also produces any inflections of the derivational forms. WFSgenerate returns an output history data structure, which is an array of histories for all of the expansions that were found. The first record in each history contains the input word, and the last record contains an inflected form, a derivational form, or an inflection of a derivational form. In this last case, a middle record will contain the derivational form, i.e., the input word with one derivational suffix attached.

From among the histories that were produced, SESgen 221 selects all inflectional forms and adds those to a result list (step 294). If derivational forms are also included within the output_history data structure, SESgen 221 selects only those derivations that have a suffix which can be attached to the current part of speech of the input word without significantly changing the meaning of the word. Only certain derivational suffixes may be attached to a base without significantly changing its meaning. As in the case of stripping suffixes, words formed by adding suffixes will have substantially the same meaning as the base word, for example, if the function of the words created by adding the suffix is semantically the same as the function of the word to which the suffix is added. A list of those suffixes appears under the appropriately labelled column in FIG. 11. Such a list of suffixes is stored in a table which SESgen accesses to determine whether any derivations have a suffix that can be attached to the current part of speech. It adds only those entries to the result list.

After SESgen has processed the input word of the information object, it loops through the synonyms found within the TH buffer in the information object (step 296). For the current synonym, SESgen 221 compares its part of speech with that of the input word (step 298). If the parts of speech are the same, SESgen 221 performs the same expansion as was described above. That is, it generates all inflections and derivations of the synonym which have only one suffix added to the synonym and it adds the inflections and only those derivations that have a suffix which can be attached to the current part of speech of the synonym to the result list for the information object (steps 300 and 302).

After SESgen 221 has looped through all of the synonyms for which expansions are to be generated, it returns the result list to SESexplist 219 (step 300).

Note that a limited form of subject expansion can be employed which does not use a thesaurus. In that case, the search is conducted using the input word plus the group of lexically related words that are generated by the morphological analyzer.

Other embodiments are within the following claims.

What is claimed is:

1. An apparatus for generating a plurality of words based upon and lexically related to an input word, comprising:
   a morphological analyzer for parsing the input word to determine at least one stem of the input word having a meaning lexically related to the meaning of the input word and, for each stem of the input word, one or more suffixes sequentially attached to the stem; and
   a word generation means responsive to the morphological analyzer for generating a first group of words from the input word that have meanings lexically related to the meaning of the input word by stripping successive suffixes from the input word,
      wherein each word of the first group of words is comprised of the input word with one or more suffixes removed, and
      wherein the suffixes stripped from the input word are selected from a first set of suffixes.

2. The apparatus for generating a plurality of words based upon and lexically related to an input word of claim 1, wherein:
   the suffixes of the first set of suffixes include only suffixes which do not substantially change the meaning of words when stripped from words.

3. The apparatus for generating a plurality of words based upon and lexically related to an input word of claim 2, wherein the first set of suffixes include the suffixes:
   #ful, #ish, +ous, +ic, +al, #ar, #er, #or, +ive, +ory, #able, +able, +ible, #ment, #ness, +ity, +ety, +ty, #ly, #ize, +ify, +fy and #y.

4. The apparatus for generating a plurality of words based upon and lexically related to an input word of claim 1, wherein:
   the first set of words includes both words that are regular inflectional nouns and words that are other than regular inflectional nouns.

5. The apparatus for generating a plurality of words based upon and lexically related to an input word of claim 1, wherein the word generation means further comprises:
   a means for generating additional words of the first group of words by adding suffixes selected from a second group of suffixes to the words of the first group of words wherein
      the suffixes of the second group of suffixes include only suffixes which do not substantially change the meaning of words when added to words.

6. The apparatus for generating a plurality of words based upon and lexically related to an input word of claim 5, wherein the second group of suffixes comprise:
   both inflectional and derivational suffixes, including the suffixes
   #ful, #ish, +ous, +ic, +al, #ar, #er, #or, +ive, +ory, #able, +able, +ible, #ment, #ness, +ity, +ety, +ty, #ly and #y.

7. The apparatus for generating a plurality of words based upon and lexically related to an input word of claim 1, further comprising:
   a thesaurus database; and
   in the word generation means, a means for indexing the thesaurus database with words of the first group of words to generate from the thesaurus database a second group of words, wherein
      the words of the second group of words are synonyms of words of the first set of words.

8. The apparatus for generating a plurality of words based upon and lexically related to an input word of claim 7, wherein the word generation means further comprises:
   a means for generating additional words of the second group of words by adding suffixes selected from a second group of suffixes to the words of the second group of words wherein
      the suffixes of the second group of suffixes include only suffixes which do not substantially change the meaning of words when added to words.

9. The apparatus for generating a plurality of words based upon and lexically related to an input word of claim 8, wherein the second group of suffixes include the suffixes:
   #ful, #ish, +ous, +ic, +al, #ar, #er, #or, +ive, +ory, #able, +able, +ible, #ment, #ness, +ity, +ety, +ty, #ly and #y.

10. The apparatus for generating a plurality of words based upon and lexically related to an input word of claim 1, wherein said morphological analyzer further comprises:
    a recognition engine for generating a derivational history for each parsing of the input word into a stem and one or more suffixes, wherein
       each derivational history includes the part of speech of the word generated by the corresponding parse of the input word.

11. A method for generating a plurality of words based upon and lexically related to an input word, comprising the steps of:
    parsing the input word to determine at least one stem of the input word having a meaning lexically related to the meaning of the input word and, for each stem of the input word, one or more suffixes sequentially attached to the stem; and
    generating a first group of words from the input word that have meanings lexically related to the meaning of the input word by stripping successive suffixes from the input word,
       wherein each word of the first group of words is comprised of the input word with one or more suffixes removed, and
       wherein the suffixes stripped from the input word are selected from a first set of suffixes.

12. The method for generating a plurality of words based upon and lexically related to an input word of claim 11, wherein:
    the suffixes of the first set of suffixes include only suffixes which do not substantially change the meaning of words when stripped from words.

13. The method for generating a plurality of words based upon and lexically related to an input word of claim 12, wherein the first set of suffixes include the suffixes:
    #ful, #ish, +ous, +ic, +al, #ar, #er, #or, +ive, +ory, #able, +able, +ible, #ment, #ness, +ity, +ety, +ty, #ly, #ize, +ify, +fy and #y.

14. The method for generating a plurality of words based upon and lexically related to an input word of claim 11, wherein:
    the first set of words includes both words that are regular inflectional nouns and words that are other than regular inflectional nouns.

15. The method for generating a plurality of words based upon and lexically related to an input word of claim 11, further comprising the steps of:

generating additional words of the first group of words by adding suffixes selected from a second group of suffixes to the words of the first group of words wherein the suffixes of the second group of suffixes include only suffixes which do not substantially change the meaning of words when added to words.

16. The method for generating a plurality of words based upon and lexically related to an input word of claim 15, wherein the second group of suffixes include the suffixes:

ful, #ish, +ous, +ic, +al, #ar, #er, #or, +ive, +ory, #able, +able, +ible, #ment, #ness, +ity, +ety, +ty, #ly and #y.

17. The method for generating a plurality of words based upon and lexically related to an input word of claim 11, further comprising the steps of:

indexing a thesaurus database with words of the first group of words to generate from the thesaurus database a second group of words, wherein the words of the second group of words are synonyms of words of the first set of words.

18. The method for generating a plurality of words based upon and lexically related to an input word of claim 17, further comprising the steps of:

generating additional words of the second group of words by adding suffixes selected from a second group of suffixes to the words of the second group of words wherein the suffixes of the second group of suffixes include only suffixes which do not substantially change the meaning of words when added to words.

19. The method for generating a plurality of words based upon and lexically related to an input word of claim 18, wherein the second group of suffixes include the suffixes:

ful, #ish, +ous, +ic, +al, #ar, #er, #or, +ive, +ory, #able, +able, +ible, #ment, #ness, +ity, +ety, +ty, #ly and #y.

20. The method for generating a plurality of words based upon and lexically related to an input word of claim 11, further comprising the step of:

generating a derivational history for each parsing of the input word into a stem and one or more suffixes, wherein each derivational history includes the part of speech of the word generated by the corresponding parse of the input word.

* * * * *